UNITED STATES PATENT OFFICE.

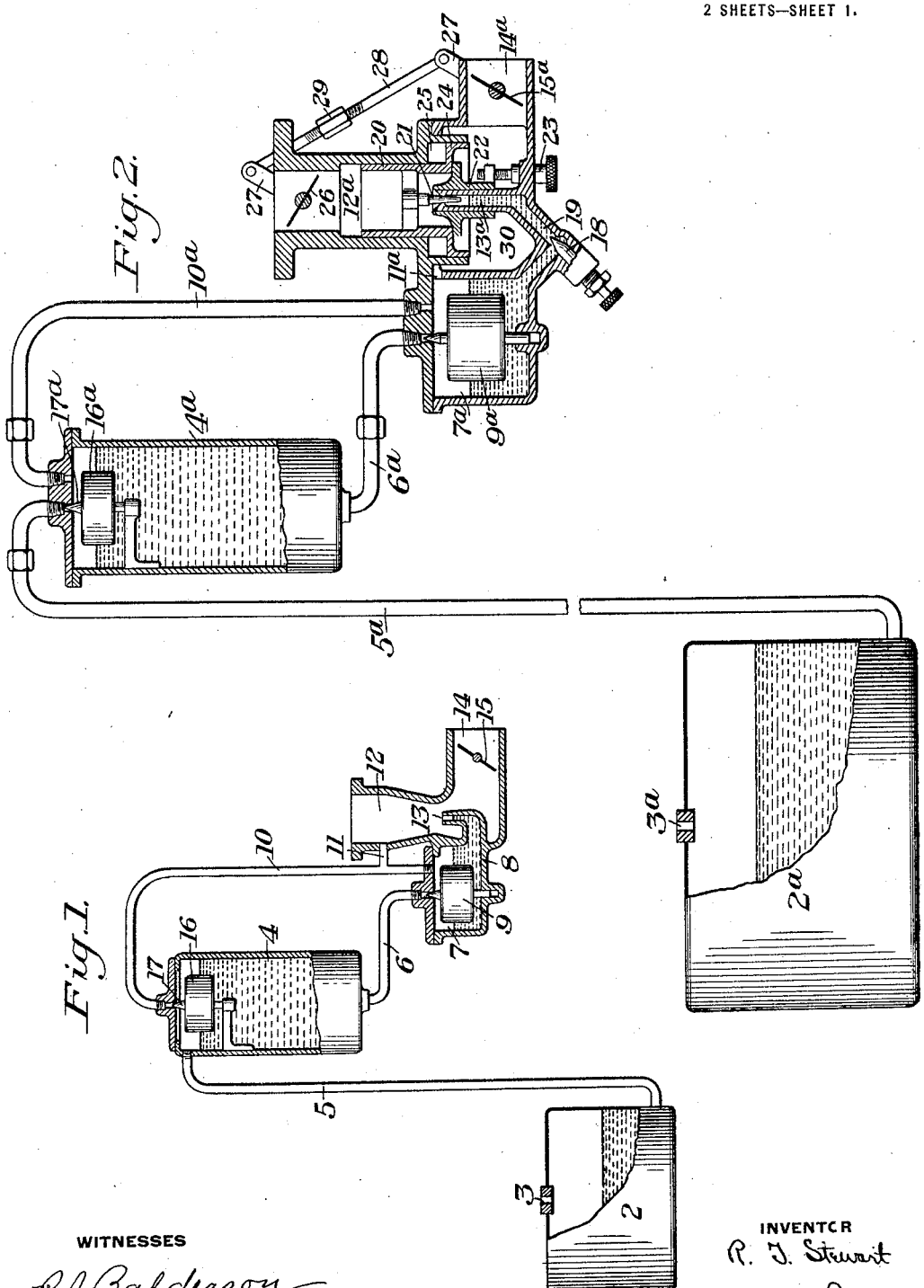

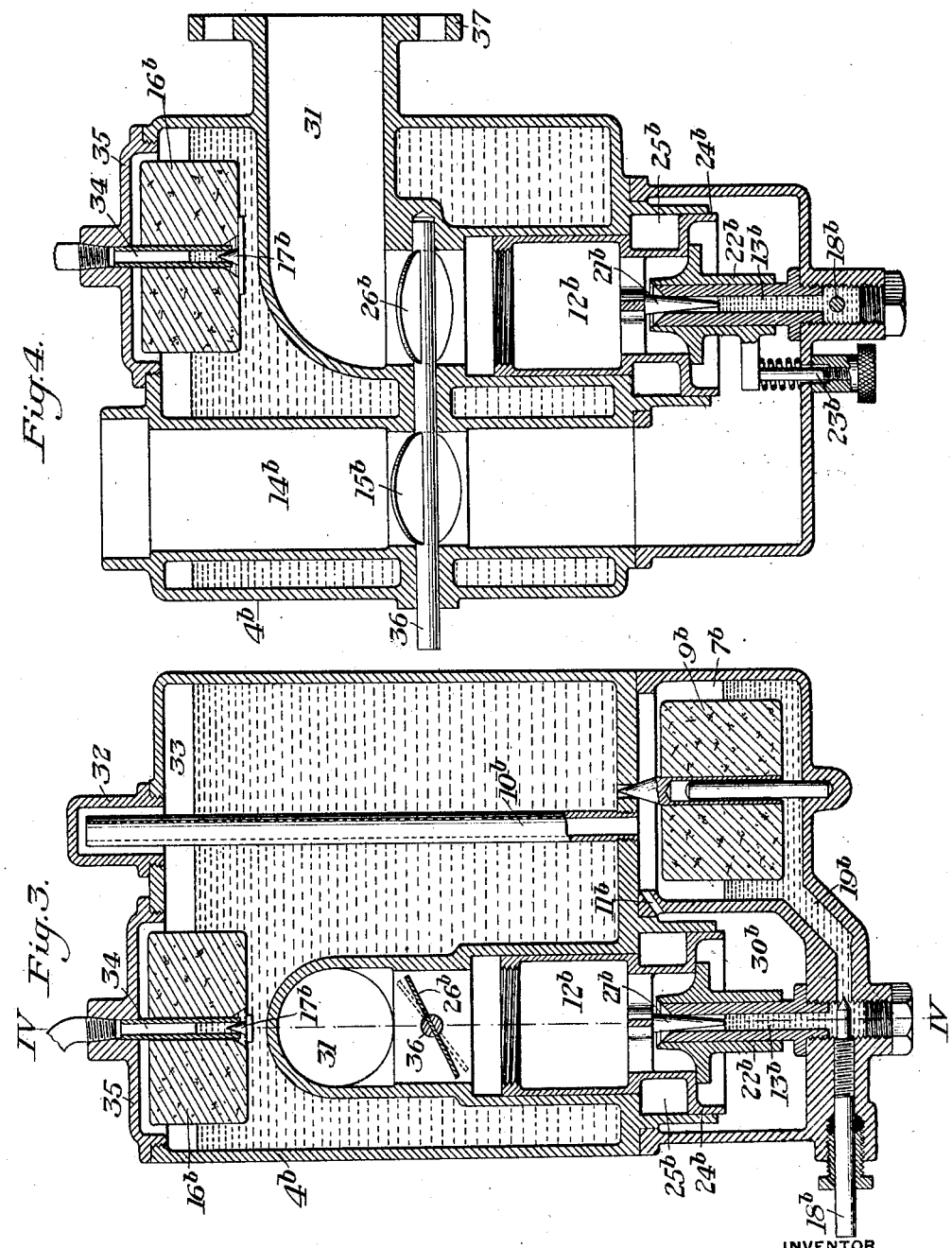

REID T. STEWART, OF PITTSBURGH, PENNSYLVANIA.

FUEL-SUPPLY SYSTEM FOR INTERNAL-COMBUSTION ENGINES.

1,399,530. Specification of Letters Patent. Patented Dec. 6, 1921.

Application filed December 28, 1915. Serial No. 69,005.

*To all whom it may concern:*

Be it known that I, REID T. STEWART, a citizen of the United States, residing at Pittsburgh, Allegheny county, Pennsylvania, have invented a new and useful Fuel-Supply System for Internal-Combustion Engines, of which the following is a full, clear, and exact description, reference being had to the accompanying drawings, forming part of this specification, in which:

Figures 1 and 2 are sectional elevations, largely diagrammatic, illustrating two different embodiments of my invention, and Figs. 3 and 4 are vertical sections, Fig. 4 being taken on the line IV—IV of Fig. 3, showing a preferred form for the actual construction of the apparatus.

My invention relates to vacuum systems for supplying liquid fuel to internal combustion engines; and is designed to provide a system of this character which is especially applicable to automobiles, or other similar service, where the fuel supply tank is located, either constantly, or at intervals, at a level below that of the carbureting chamber.

A further object of my invention is to provide a system of this kind which is simple in its construction, having but few parts; which is self-controlled, and which will operate effectively under the varying conditions of service.

Referring first to that form of my invention shown in Fig. 1, the numeral 2 designates a supply tank, vented to the atmosphere at 3, and from which the fuel is drawn into a supplemental tank 4 at a higher level, through the pipe 5. The tank 4 has a feed pipe 6 leading from its bottom portion into the float chamber 7 of the carbureter 8. 9 designates the usual float for controlling the inlet to said chamber. 10 is a suction pipe connecting the upper portion of the float chamber with the upper portion of the supplemental tank 4, and having a branch 11 communicating with the carbureting chamber 12 above the fuel supply nozzle 13. 14 designates the air inlet and 15 a controlling throttle therein.

16 is a float in the supplemental tank carrying the needle valve 17 which controls the communication between the interior of said tank and the suction pipe 10. This float may, however, be made to control the fuel supply pipe in the manner shown in Fig. 2, hereinafter described. This valve in one or the other of its arrangements, is an important feature, since it prevents any possibility of flooding through the pipe 10.

It will be apparent that the vacuum or suction which exists in the carbureting chamber 12, due to the action of the engine, will be communicated simultaneously to the supplemental tank 4 and to the carbureter float chamber 7. When the extent of the vacuum is sufficient to lift the fuel to the top of the supplemental tank, the excess of fuel entering said tank over that delivered to the carbureter will become automatically stored in said tank, causing the level to rise therein until the float 17 acts to close the communication to the suction pipe 10. After this time a constant fuel level is maintained in the supplemental tank under normal conditions, ready for delivery to the carbureter at any time the vacuum becomes insufficient to lift the fuel to the supplemental tank. For instance, an automobile, having its main supply tank 2 located at the rear, and equipped with this vacuum system, when ascending a steep hill with fully opened carbureter, will be feeding its carbureter with fuel drawn directly from the storage supply in the supplemental tank, until such time as the hill is surmounted. The re-charging of the supplemental tank will then at once automatically begin. The system is thus rendered automatic for all operating conditions. The suction passages which interconnect the interior of the supplemental tank, the float chamber and the carbureting chamber, in addition to functioning in the manner above described, also provide a perfect vent for any fuel vapor or air which would otherwise collect in the supplemental tank and in the carbureter float chamber.

These vacuum connections maintain at all times equal pressures in the chambers which they interconnect, thus insuring a perfect gravity feed of fuel from the supplemental tank to the float chamber under all conditions. In the type of carbureter illustrated in Fig. 1, fuel flow from the float chamber to the carbureting chamber is caused by the aspirating action of the air flowing through the Venturi tube around the fuel nozzle 13 which is disposed in a restricted portion thereof.

It will be further noted that the pipes 5, 6 and 10 are normally unrestricted, no valves being required for the supplemental chamber except the valve operated by the float 16, and which may control either the pipe 10 or the pipe 5.

Fig. 2 shows another embodiment of my invention which is exceedingly flexible in its action and gives excellent results when applied to automobile service. The general construction and arrangement is the same as that described in Fig. 1, and similar reference numerals have been applied to corresponding parts, with the letter $a$ affixed thereto. I have, however, shown the float $16^a$ as having its valve $17^a$ controlling the discharge of the pipe $5^a$. In this form I have also shown a suplemental needle control valve 18 interposed in the fuel passage 19 leading from the float chamber to the carbureting chamber. I have also shown the latter as having a hollow sleeve air valve 20 carrying a metering pin or needle valve 21 which extends into the orifice of the fuel nozzle $13^a$. This sleeve valve seats upon an adjustable sleeve 22 fitting around the fuel nozzle $13^a$ and provided with an adjusting screw 23. The lower end portion of the sleeve valve is enlarged, as indicated at 24, with a corresponding offset in the adjacent portion of the casing, so as to provide the air cushion 25. The valve is actuated solely by gravity and the suction action of the engine.

In this form of my invention I also prefer to employ an anterior throttle valve $15^a$ in the air inlet $14^a$, and a posterior throttle valve 26 in the connection leading from the carbureting chamber to the engine. Each of these valves is actuated by a crank 27, and the two cranks are connected by a two-part link 28, having a turnbuckle, or other adjustable connection 29.

By reason of the connection 28 the two throttles are actuated simultaneously; and by suitably adjusting the length of the link 28, or by shifting either crank 27 angularly with respect to the valve it actuates, either throttle may be given a lead of opening over that of the other. In this manner any desired degree of vacuum range may be had in the carbureting chamber.

This series throttling arrangement possesses the advantages, without the attendant disadvantages, of a single throttle, whether the latter be located at the inlet or the outlet. This is because the series throttles can be adjusted to give just the range of vacuum desired to lift the fuel to the top of the supplemental tank, whereas, if the throttle $15^a$ were used alone, it of necessity would give a vacuum range at least five times as great as is desired, with the attendant operating disturbances. Furthermore, the series throttles can be made to operate with a relatively small vacuum in the engine intake when the automobile is ascending a steep hill, with wide open throttles, thus insuring a maximum power. If the throttle 26 were the only one used, the carbureter must of necessity be proportioned for a considerably greater degree of vacuum for this same operating condition, thus admitting to the engine cylinder a somewhat rarified charge, which lessens the power developed at a time when maximum power is most desired.

The embodiment of my invention shown in Fig. 2 also furnishes a means for enriching the mixture when the engine speed is being accelerated. This desirable result is due to the unrestricted passages $6^a$, $10^a$ and $11^a$, (when open) in combination with the throttle $15^a$ and the cushioned air valve. By more or less rapid opening of the throttle $15^a$, or series throttles $15^a$ and 26, an increase in pressure difference between the air inlet chamber 30 and the carbureting chamber will temporarily occur. The amount and duration of this will depend, first, upon the rapidity with which the throttles are opened; second, upon the inertia of the air valve; and, third, upon the effectiveness of the air valve cushioning. Because of the unrestricted passage $11^a$ connecting the chamber 30 with the float chamber, there will be an increase in pressure difference between the float chamber and the carbureting chamber $12^a$. This results in a temporary enrichment of the mixture delivered to the engine, and makes it possible to get the automobile promptly under way after being slowed down, as at crossings, etc., without being obliged to use an unnecessarily enriched mixture for ordinary operating conditions. The latter is not only uneconomical in the use of fuel, but is apt to foul the engine by excessive deposits of carbon.

This same means also provides for the ordinary running conditions, and is an aid to the aspirating action of the air flowing in around the fuel nozzle. This aid to fuel flow is substantially constant in action, while the aspirating action necessarily diminishes as the throttles approach their closed positions. When properly adjusted therefore, there is insured a perfectly satisfactory mixture for the widest possible range of both speed and power conditions.

This means, or other equivalent device for automatically establishing in a definite manner a higher pressure in the float chamber of a carbureter than that which simultaneously exists in its carbureting chamber, may be used, when properly proportioned, as the chief or only means for causing fuel flow from the float chamber to the carbureting chamber, as, for instance, in the application of my improved vacuum feed system, where it is desired to use a non-aspirating type of carbureter.

Figs. 3 and 4 show a practical structural embodiment of my vacuum fuel feed system, in which the supplemental fuel storage chamber is made a part of the carbureter itself. In order to enable the construction to be more easily understood I have applied corresponding reference characters to the parts in these figures which correspond to the parts shown in Fig. 1, with the letter *b* affixed.

It will be seen that in this embodiment of my invention the supplemental tank 4$^b$ is superimposed directly upon the carbureter and surrounds the air inlet 14$^b$, the carbureting chamber 12$^b$, and the passage 31 from the carbureting chamber to the engine. The connection 10$^b$ corresponding to the pipe 10 of Fig. 1, leads directly up through the fuel chamber of the supplemental tank 4$^b$ and terminates at its upper end in a removable cap 32 which has an air space communicating with the air space 33 at the top of said tank. The float 16$^b$ is shown as arranged to rise and fall upon an inlet pipe extension 34 secured in a removable cap 35. The float carries the valve 17$^b$ which controls the discharge of the pipe 34.

This construction also permits the anterior and posterior throttles 15$^b$ and 26$^b$ to be carried on a single common shaft 36, the two throttles being set at different angles with respect to the axis of said shaft so as to give the throttle 15$^b$ a lead over the throttle 26$^b$, as more clearly indicated in Fig. 3.

This embodiment of my invention possesses the following further desirable characteristics; viz., it is simple and inexpensive to construct, and may be easily and readily attached to the engine by means of the bolting flange extension 37. It may be given a rectangular or block form, and when attached directly to the engine body, it harmonizes perfectly with the block type of automobile engine now in vogue. Where the carbureter is used with an air heater which can be connected and disconnected at will, the range in temperature between summer and winter conditions of the fuel supply can be greatly lessened, because of the fact that the supplemental fuel storage space immediately surrounds the air intake of the carbureting chamber.

I do not desire to limit myself to the embodiments of my invention which I have herein shown and described. For example, various types of carbureters may be substituted for those illustrated, provided that the parts are suitably proportioned, and means are provided for maintaining, at least periodically, under operating conditions, a sufficient vacuum in the carbureting chamber, or other parts connected directly or indirectly thereto, to effect a fuel lift. Any suitable form of supplemental fuel tank may be used, and various other changes may be made within the spirit and scope of the appended claims.

I claim:

1. In combination, a carbureting passageway having an air inlet at one end and a mixture outlet at the other end, a fuel inlet to said carbureting passageway, a float chamber feeding said fuel inlet, a throttle valve in said mixture outlet, a supplemental fuel tank adapted to draw fuel from a source of supply, said supplemental tank being arranged at a higher level than said float chamber to feed thereto, suction means communicating with said carbureting passageway at a point anterior to said throttle valve and extending to said float chamber and to said supplemental fuel tank, said suction means being operative to create substantially equal degrees of suction in said float chamber and said supplemental tank, and a float controlled valve in said supplemental tank for restricting the fuel level therein.

2. In combination, a carbureting passageway having an air inlet and a mixture outlet, an aspirating fuel inlet to said carbureting passageway, a float chamber feeding said fuel inlet, a throttle valve in said mixture outlet, a supplemental fuel tank arranged at a higher level than said float chamber and arranged to deliver thereto by gravity through an interconnecting fuel passage, a suction passage communicating with said carbureting chamber at a point anterior to said throttle valve and extending to said float chamber above the fuel level therein, a second valve anterior to said throttle valve and coöperating therewith for maintaining a predetermined range of suction between said valves, a suction passage communicating with said supplemental fuel tank above the fuel level therein and operative to create substantially equal degrees of suction in said float chamber and in said supplemental fuel tank, a main fuel supply tank, a fuel passageway connecting said main supply tank with said supplemental fuel tank, and float controlled means in said supplemental fuel tank for restricting the fuel level therein.

3. In a fuel supply system for internal combustion engines, the combination with a carbureter, of a supplemental fuel supply tank superimposed upon the carbureter, the air intake of the carbureter, its carbureting chamber, and the passageway connecting said carbureting chamber with the engine intake extending through the fuel storage space of the supplemental tank, substantially as described.

4. In a fuel supply system for internal combustion engines, the combination with a carbureter having the usual constant level chamber, of a supplemental fuel supply tank seated directly upon and over the carbureter, said tank being of rectangular block form and having a bolting flange for direct attachment to the engine, substantially as described, the mixture outlet of said carbureter extending out through the side of said supplemental tank.

5. In a fuel supply system for internal combustion engines, the combination with a carbureter having a float chamber, of a supplemental fuel supply tank situated directly over the carbureter, an unrestricted passage connecting the float chamber with the carbureting chamber, another unrestricted passage connecting the float chamber with the upper portion of the supplemental tank, a main supply tank, a fuel pipe connecting the two tanks, and means for automatically shutting off the feed of fuel from the main tank to the supplemental tank when a given level is reached in the supplemental tank, substantially as described.

6. In combination, a carbureting chamber having air and fuel inlets, a float chamber connected below the fuel level therein with said fuel inlet, a supplemental tank placed at a higher level than and feeding liquid fuel to said float chamber, a main tank feeding liquid fuel to said supplemental tank, means for applying substantially the same degree of suction to said float chamber over the fuel level therein and to the main tank through the supplemental tank, means controlling application of suction to said supplemental tank, and means responsive to the fuel level in said supplemental tank controlling the application of suction to said main tank.

7. In combination, a carbureting chamber having air and fuel inlets, a float chamber connected below the fuel level therein with said fuel inlet, a supplemental tank placed at a higher level than and feeding liquid fuel to said float chamber, a main tank feeding liquid fuel to said supplemental tank, means for applying suction through said float chamber over the fuel level therein and through said supplemental tank to the main tank, and a float controlled valve in said supplemental tank controlling the feeding of liquid fuel from said main tank to said supplemental tank.

In testimony whereof, I have hereunto set my hand.

REID T. STEWART.

Witnesses:
   GEO. B. BLEMING,
   GEO. H. PARMELEE.